(12) United States Patent
Post

(10) Patent No.: US 6,565,280 B1
(45) Date of Patent: May 20, 2003

(54) FASTENING MECHANISM FOR CONNECTING A SPORTS ATTACHMENT TO A SPORTS SHAFT

(76) Inventor: Peter G. Post, 41 Maynard Rd., Northampton, MA (US) 01060

( * ) Notice: Subject to any disclaimer, the term of this patent is extended or adjusted under 35 U.S.C. 154(b) by 0 days.

(21) Appl. No.: 09/616,277

(22) Filed: Jul. 14, 2000

Related U.S. Application Data

(60) Provisional application No. 60/144,295, filed on Jul. 16, 1999.

(51) Int. Cl.[7] ............................. A63B 59/14; B25G 3/26
(52) U.S. Cl. ....................... 403/325; 403/334; 473/562
(58) Field of Search ............................... 403/325, 326, 403/327, 328, 109.3, 109.2, 333, 334; 464/901, 172; 473/560, 562

(56) References Cited

U.S. PATENT DOCUMENTS

| | | | | |
|---|---|---|---|---|
| 1,331,806 A | * | 2/1920 | Curtis | 279/79 |
| 2,441,265 A | * | 5/1948 | Frye | 403/325 |
| 3,449,003 A | * | 6/1969 | Hunt | 403/325 |
| 3,980,409 A | * | 9/1976 | Turner | 403/108 |
| 4,042,305 A | * | 8/1977 | Vincent | 403/354 |
| 4,079,978 A | * | 3/1978 | McMullin | 294/19 R |
| 4,385,849 A | * | 5/1983 | Crain | 403/109 |
| 5,083,883 A | * | 1/1992 | Ueda et al. | 403/324 |
| 5,255,993 A | * | 10/1993 | Kovacs | 403/328 |
| 5,447,306 A | * | 9/1995 | Selden | 273/67 A |
| 5,593,196 A | * | 1/1997 | Baum et al. | 403/328 |
| 5,628,509 A | * | 5/1997 | Christian | 473/562 |
| 6,033,327 A | * | 3/2000 | Bird | 473/560 |
| 6,152,839 A | * | 11/2000 | Heyduk | 473/562 |
| D435,614 S | * | 12/2000 | Illiano | D21/727 |

* cited by examiner

Primary Examiner—Lynne H. Browne
Assistant Examiner—Kenn Thompson
(74) Attorney, Agent, or Firm—Emery L. Tracy

(57) ABSTRACT

A fastening mechanism for connecting a sports attachment to a shaft is provided. The fastening mechanism comprises an aperture formed in the shaft. A fastening member is mounted to the sports attachment with at least a portion of the fastening member receivable within the aperture. A biasing mechanism biases at least a portion of the fastening member in the aperture wherein the fastening member is releasably maintained within the aperture thereby releasably connecting the sports attachment to the shaft.

12 Claims, 2 Drawing Sheets

FASTENING MECHANISM FOR CONNECTING A SPORTS ATTACHMENT TO A SPORTS SHAFT

The present application claims benefit of provisional patent application Ser. No. 60/144,295, filed on Jul. 16, 1999, entitled "Device for Making Sports Stick Attachments Removable".

BACKGROUND OF THE INVENTION

1. Field of the Invention

This invention relates generally to a fastening mechanism for connecting together sport attachments and sports shafts and, more particularly, it relates to a fastening mechanism for releasably connecting sport attachments to sports shafts which is spring-loaded for providing easy connection and removability of the sports attachments from the sports shaft and easy interchangeability of various sports attachments on a single sports shaft.

2. Description of the Prior Art

In any sport that uses a sports stick of some kind as part of the game, there exists the possibility that the shaft of the sports stick will break or become worn so that a player desires to replace all or part of the sports stick. In hockey, as played both on ice and on other surfaces, it is common for the blade or other sport attachment of the sports stick to break before the shaft. In fact, due to the intense nature of the sport, hockey and lacrosse sticks are subject to a variety of stresses and shocks during play. These stresses and shocks often result in broken blades or heads which require replacement before they can be used.

Therefore, in addition to the well-known single piece sports stick, manufacturers have developed sports sticks having separate shafts and replacement blades. To eliminate the need to replace the entire sports stick, hockey and lacrosse stick assemblies have been designed so that only the damaged blade or head need be replaced. Using conventional methods, replacing the damaged blade or head has been time consuming, and requires auxiliary equipment.

A variety of mechanisms exist in the art that allow replacement of blades or heads, but all involve of these mechanisms require either heating one or more of the elements or unscrewing the damaged parts and screwing in replacements. One method for attaching a replacement blade to a separate hockey shaft is by way of remeltable glue placed on either the tenon of the replacement blade, or inside the shaft. One difficulty that this method presents is that a means for heating the glue is required for removing and replacing a blade. Therefore, the user must carry a heating apparatus to the play area in order to replace his or her blade.

A second method of replacement blade attachment is by way of a tapered setscrew embedded in the tenon of the replacement blade. The screw is accessed through a hole in the shaft and must be turned by a screwdriver. The drawback of this method is that a separate tool is required to remove and replace blades and the correct ancillary equipment must be on hand during play in order to effect the change.

A third method employs rubber barbs on the tenon that grip the inside of the shaft when the tenon is inserted. Unfortunately, with this method, there are no means for securely locking the blade to the shaft and the chances for inadvertent dislodgment of the blade from the shaft are greatly increased.

A fourth method is set forth in the Selden patent, U.S. Pat. No. 5,447,306, discloses a spring mechanism for releasably locking a replacement hockey blade to a shaft. The Selden patent describes a U-shaped spring that fits over an intermediary shaft connected to the replacement blade and then to the shaft of the stick. While the invention of the Selden patent obviates the need for heating glue to release the blade from the shaft, it adds difficulty in manufacture by the addition of extra elements and connections, and does not adequately allow for fingertip access to the locking mechanism.

Accordingly, there exists a need for a fastening mechanism for connecting sport attachments to sports shafts to overcome not only the need for a heating element to soften a glue attachment means, but also the manufacturing and use difficulties presented by the Selden patent. Additionally, a need exists for a fastening mechanism for connecting sport attachments to sports shafts requires no glue or heat gun and no extra tools of any kind. Furthermore, there exists a need for a fastening mechanism for connecting sport attachments to sports shafts, and provides a means for positively releasably locking the sports attachment to the shaft as well as fingertip access to the fastening mechanism.

SUMMARY

The present invention is a fastening mechanism for connecting a sports attachment to a shaft. The fastening mechanism comprises an aperture formed in the shaft. A fastening member is mounted to the sports attachment with at least a portion of the fastening member receivable within the aperture. A biasing mechanism biases at least a portion of the fastening member in the aperture wherein the fastening member is releasably maintained within the aperture thereby releasably connecting the sports attachment to the shaft.

The present invention additionally includes a device for releasably securing together a blade and a shaft of a sporting item with the blade having a tenon and the shaft having a hollow portion. The tenon of the blade is receivable within the hollow portion. The device comprises a spring-biased fastener mounted to the tenon and an aperture in the shaft, the aperture extending into the hollow portion and receiving at least a portion of the fastener.

The present invention further includes a method for constructing a sports stick. The sports stick has a sports attachment having a tenon and a shaft having a hollow portion with the tenon being receivable within the hollow portion. The method comprises forming an aperture through the shaft into the hollow portion, mounting a fastening member to the tenon of the sports attachment, inserting the tenon of the sports attachment into the hollow portion of the shaft, aligning the fastening member with the aperture in the shaft, and urging at least a portion of the fastening member into the aperture.

DETAILED DESCRIPTION OF THE EMBODIMENTS

Figure 1:
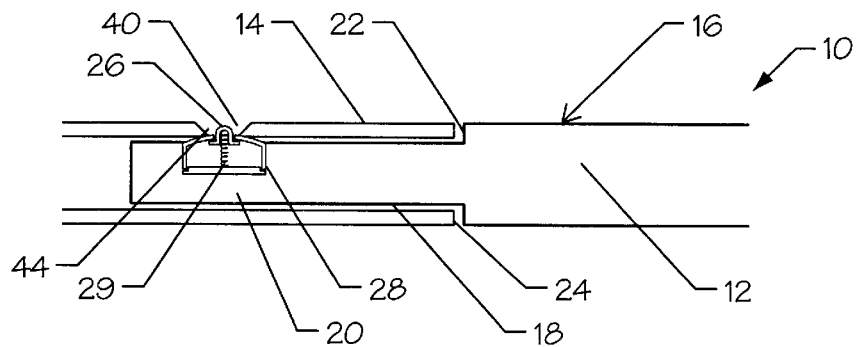
FIG. 1 is a sectional side view of a fastening mechanism for connecting sport attachments to sports shafts, constructed in accordance with the present invention, with the fastening mechanism being a spring-actuated button within a housing mounted within a tenon of the sport attachment and being received within an aperture formed in the sports shaft.

As illustrated in FIGS. 1–6, the present invention is a fastening mechanism, indicated generally at 10, for releasably connecting together a sports attachment 12, such as a replaceable blade or head, and a replaceable sport shaft 14 of a sports stick 16 such as an ice hockey stick, a street hockey stick, a field hockey stick, a lacrosse stick, etc. For clarity of description, the discussion herein will discuss the sports stick 16 being a hockey stick assembly, the sport attachment being a hockey stick blade portion, and the sport shaft 16 being a shaft portion of the hockey stick assembly.

The shaft portion 14 of the hockey stick assembly 16 has a hollow portion 18, and can be constructed of a variety of metals and plastics, including fiberglass and other composite materials known in the art. The blade portion 12 consists of a blade area (not shown) for handling a puck or ball and a tenon 20 for insertion into the hollow portion 18 of the hockey shaft portion 14. The tenon 20 can be either straight or tapered. Preferably, however, to ease in insertion of the tenon 20 of the blade portion 12 into the hollow portion 18 of the shaft portion 14, the tenon 20 is tapered to match a similar taper on the inside of the hollow portion 18 of the shaft portion 14 of the hockey stick assembly 16.

The tenon 20 extends above shoulders 22 formed on the blade portion 12 of the hockey stick assembly 16. The shoulders 22 of the blade portion 12 are sized so that a bottom edge 24 of the shaft portion 14 of the hockey stick assembly 16 rests on the shoulders 22 when the tenon 20 is fully inserted into the hollow portion 18 of the shaft portion 14 and the outside of the shoulders 22 are flush with the outside of the shaft portion 14.

There are several embodiments of the fastening mechanism 10 of the present invention which will be described herein. A person skilled in the art will understand that other embodiment are within the scope and spirit of the present invention. The inventor will now describe the fastening mechanism 10 embodiments of the present invention in detail.

Button in a Housing

Figure 2:
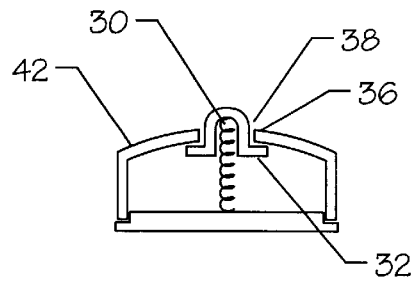
FIG. 2 is a sectional side view illustrating the fastening mechanism for connecting sport attachments to sports shafts of FIG. 1, constructed in accordance with the present invention, with the housing having a domed top wall.

In this embodiment of the fastening mechanism 10 of the present invention, as illustrated in FIGS. 1 and 2, the fastening mechanism 10 has at least one spring-actuated button 26 slidably engaged within a housing 28 mounted within the tenon 20 of the blade portion 12. The housing 28 is preferably comprised of two parts that mate together either by press-fitting, screwing together, or other means. The button 26 is seated within the housing 28 with a spring 29 urging the button 26 in a general direction through an open end 38 of the housing 28. The spring 29 is preferably a coil spring, although other types of springs are within the scope of the present invention.

The button 26 can be cylindrical or any other shape consistent with the object of the invention, and the button 26 can have a hollow core 30 and one open end 32. Preferably, about the open end 32 of the button 26 is an annular retaining lip 34. The housing 28, likewise, includes a corresponding retaining lip 36 on the open end 38 of the housing 28 to engage the annular retaining lip 34 of the button 26.

The entire fastening mechanism 10 of the present embodiment of the present invention is sized and shaped to fit into the tenon 20 of the blade portion 12, such that when the tenon 20 is received within the hollow portion 18 of the shaft portion 14, the button 26 engages an aperture 40 provided in the shaft portion 14. In the shaft portion 14 of the hockey stick assembly 16, the aperture 40 is provided through one or more sides of the shaft portion 14 so that when the tenon 20 of the replacement blade portion 12 is fully inserted into the hollow portion 18 of the shaft portion 14, the spring-loaded button 26 in the fastening mechanism 10 will extend through the shaft aperture 40 providing a secure releasable lock against accidental removal of the blade portion 12 from the shaft portion 14.

The housing 28 of the fastening mechanism 10 can be circular and can have a domed top wall 42 (as illustrated in FIG. 2) so that when the tenon 20 is inserted into the hollow portion 18 of the shaft portion 14, the domed top wall 42 of the housing 28 creates a snug fit between the tenon 20 and the shaft portion 14. The entire fastening mechanism 10 can be made of metal or plastic, or any other material consistent with the object of the invention.

While the fastening mechanism 10 of the present invention has been described and illustrated as having one (1) button 26 and one (1) corresponding housing 28, it is within the scope of the present invention to provide more than one (1) button 26 and more than one (1) corresponding housing 28. Additional buttons 26 and corresponding housings 28 further releasably secure the blade portion 12 to the shaft portion 14 of the hockey stick assembly 16.

To release the blade portion 12 from the shaft portion 14, the button or buttons 26 are depressed while the shaft portion 14 and the blade portion are pulled apart in a direction generally away from each other. Preferably, the shaft aperture 40 is surrounded by a fingertip access depression 44 to aid in the removal of the blade portion 12 from the shaft portion 14. In hockey and other sports there is often contact between sticks and other sticks, players' equipment, pucks, balls and the like. The fingertip access depressions 44 allow for protection of the button or buttons 26 of the fastening mechanism 10 and for ease of access to the buttons 26 by the user. If the buttons 26 of the fastening mechanism 10 protrude beyond the shaft portion 14, it is more than likely that the buttons 26 would encounter contact from one of the above sources and the blade portion 12 of the hockey stick assembly 16 could become undesirably detached from the shaft portion 14.

In a preferred embodiment of the present invention, the button or buttons 26 of the fastening mechanism 10 protrude from the shaft portion 14 no further outward than the depth of the fingertip access depressions 44. This feature also allows a player to place tape or other means over the area of the fingertip access depressions 44 to further protect the buttons 26 of the locking mechanism 10 from accidental release.

Cupped Spring

Figure 3:
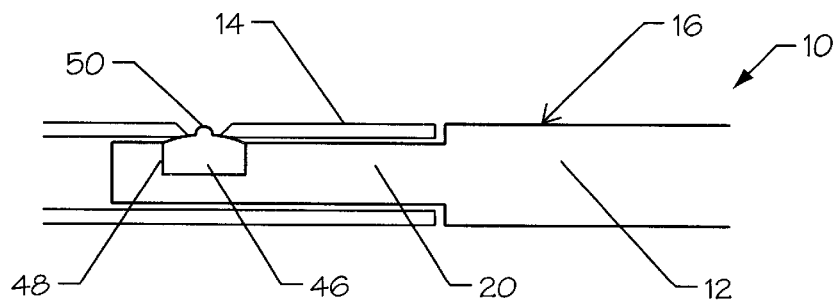
FIG. 3 is a sectional side view illustrating another embodiment of the fastening mechanism for connecting sport attachments to sports shafts, constructed in accordance with the present invention, with the fastening mechanism being a cupped spring received within the tenon of the sport attachment and being received within the aperture formed in the sports shaft.

In another embodiment, as illustrated in FIG. 3, the spring-actuated fastening mechanism 10 is a "cupped" spring device 46. The cupped spring device 46 can be made of steel or any other appropriate elastomer material which can be deformed for insertion into the aperture 40 of the shaft portion 14 of the hockey stick assembly 16, but returns to its original shape upon release of the force causing the deformation. Preferably, the cupped spring device 46 has a round cross-sectional configuration, although a cupped spring device 46 having other cross-sectional configurations including, but not limited to, rectangular, etc., are within the scope of the present invention.

The cupped spring device 46 is seated in an "upside down" manner within a hole or depression 48 formed in the tenon 20 of the blade portion 12 of the hockey stick assembly 16. Likewise, the cupped spring device 46 can fitted with a button or protrusion 50 that can be depressed during insertion of the tenon 20 into the hollow portion 18 of the shaft portion 14 and releasably engage the aperture 40 in the shaft portion 14 of the hockey stick assembly 16.

Longitudinal Locking Mechanism

Figure 4:
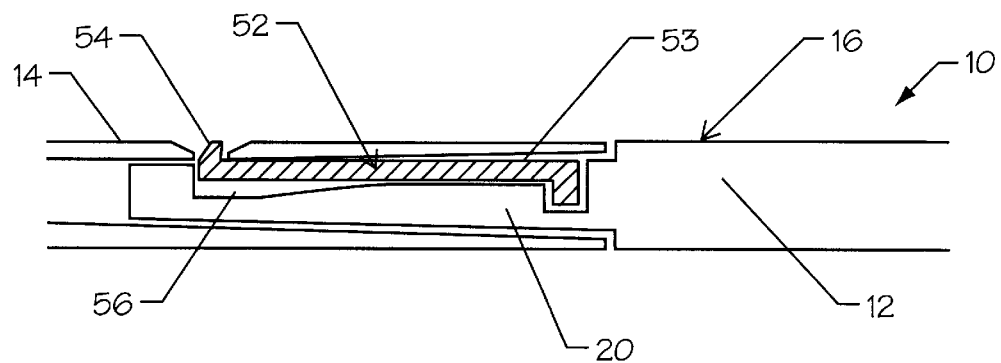
FIG. 4 is a sectional side view illustrating still another embodiment of the fastening mechanism for connecting sport attachments to sports shafts, constructed in accordance with the present invention, with the fastening mechanism being an elongated member having an enlarged portion receivable within the aperture in the sports shaft.
Figure 5:
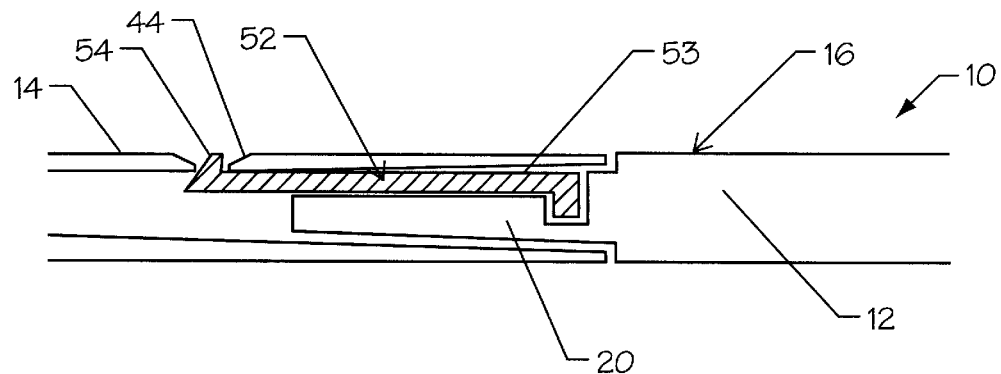
FIG. 5 is a sectional side view illustrating yet another embodiment of the fastening mechanism for connecting sport attachments to sports shafts, constructed in accordance with the present invention, with the fastening mechanism being an elongated member and extending beyond an end of the tenon of the sports attachment.

In another preferred embodiment of the fastening mechanism 10 of the present invention, as illustrated in FIGS. 4 and 5, the fastening mechanism 10 consists of an elongated strip 52 of spring-like plastic or other material. The elongated strip 52 is situated along the tenon 20 of the blade portion 12 of the hockey stick assembly 16 and has a substantially flat length 53 fitted with a protruding button or enlarged portion 54 at one end of the elongated strip 52 and attached to the tenon 20. The tenon 20 preferably includes a groove 56 formed longitudinally on one side of the tenon 20 for receiving at least a portion of the flat length 53 and the elongated strip 52. It is within the scope of the present invention for the enlarged portion 54 to be any shape including, but not limited to, round, square, wedge-shaped, etc.

The flat length 53 of the elongated strip 53 of the fastening mechanism 10 of the present invention is mounted along the tenon 20 of the blade portion 12 so that the enlarged portion 54 is situated either entirely over the groove 56 in the tenon 20, as illustrated in FIG. 4, or extending over the end of the tenon 20. Also, the flat length 53 of the fastening mechanism 10 is situated so that when the tenon 20 of the blade portion 12 is fully inserted into the hollow portion 18 of the shaft portion 14, the enlarged portion 54 of the elongated strip 52 aligns with the fingertip access aperture 40 in the shaft portion 14. It is within the scope of the present invention that more than one (1), i.e., two (2) or more, such elongated strips 52 may be employed on opposite or contiguous sides of the tenon 20 of the blade portion 12 of the hockey stick assembly 16. It is within the scope of the present invention to include one (1) or more of such elongated strips 52 on the tenon 20 of the blade portion 12.

Mechanism Molded In

The fastening mechanism 10 can be laminated or molded into the tenon 20 of the blade portion 12 of the hockey stick assembly 16. It is within the scope of the present invention that the fastening mechanism 10 be constructed of the same material as or a material compatible with a moldable and suitably strong material to serve as a blade portion 12 for a hockey stick assembly 16.

The tenon 20 of the blade portion 12 can be manufactured separately from the rest of the blade portion 12. The tenon 20 can be injection molded or formed by any other method. The injection molded tenon 20 can have the fastening mechanism 10 molded directly during the injection molding process. In this manner, the tolerances can be controlled.

Figure 6:
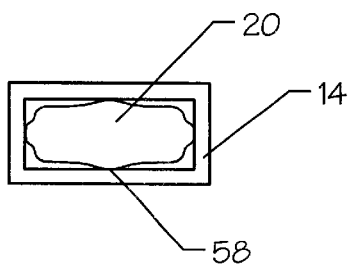
FIG. 6 is an sectional end view illustrating still yet another embodiment of the fastening mechanism for connecting sport attachments to sports shafts, constructed in accordance with the present invention, with the tenon of the sport attachment having molded ridges to maintain a tight fit of the tenon within the sport shaft.

As illustrated in FIG. 6, the tenon 20 can be provided with longitudinal ridges 58 on each or any side of the tenon 20 for tolerance control. The shoulder 22 of the tenon 20 can have several raised areas, dots, lines, etc., also to take up slack, and ensure a snug fit between the shoulder 22 of the tenon 20 and the shoulder bottom edge 24 of the shaft portion 14.

There are many advantages of providing a fastening mechanism 10 of the present invention. No tools are required for easy and safe quick-release action between the blade portion 12 and the shaft portion 14. No heat needs to be applied. Manufacturing tolerances can be controlled. Fingertip depressions on the shaft portion 14 protect from accidentally dislodgment. Simple, one-piece construction provides greater stability and security of the tenon-shaft portion connection because the tenon 20 can be full-length and does not require ancillary stubs or attachments. Tolerance absorption because of the pressure of the domed top housing 28 or cupped spring device 46 against the inside of the hollow portion 18 of the shaft portion 14 and snug fit from the mating tapers of the tenon and the shaft portion 14.

The foregoing exemplary descriptions and the illustrative embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A fastening mechanism for connecting a sports attachment to a shaft, the sports attachment having a tenon, the shaft having a handle end and an attachment end, the fastening mechanism comprising:

a hollow portion formed in the attachment end of the shaft;

an aperture formed in the shaft into the hollow portion;

at least one ridge formed along the tenon for contacting the hollow portion within the aperture;

a fastening member mounted to the tenon of the sports attachment, at least a portion of the fastening member receivable within the aperture; and biasing means for biasing at least a portion of the fastening member into the aperture;

wherein the fastening member is releasably maintained within the aperture thereby releasably connecting the sports attachment to the shaft.

2. The fastening mechanism of claim 1 wherein the fastening member comprises:

a housing mounted to the sports attachment, the housing having a first open end and a longitudinal axis; and a first tubular member movable along the longitudinal axis within the first open end of the housing;

wherein the spring means biases the first tubular member in a general direction away from the housing to urge the first tubular member into the aperture of the shaft.

3. The fastening mechanism of claim 2 wherein the spring means comprises a coil spring.

4. The fastening mechanism of claim 2 and further comprising:

a flange about the open end of the housing; and a shoulder about the tubular member;

wherein the shoulder of the tubular member contacts the flange of the open end of the housing thereby limiting the extent of movement of the tubular member relative to the housing.

5. The fastening mechanism of claim 1 wherein the hollow portion is tapered and the tenon correspondingly tapered such that the tenon is receivable within the hollow portion.

6. A method for constructing a sports stick, the sports stick having a sports attachment having a tenon and a shaft having a hollow portion, the tenon receivable within the hollow portion, the method comprising:

forming at least one ridge on the tenon;

forming an aperture through the shaft into the hollow portion;

mounting a fastening member to the tenon of the sports attachment;

inserting the tenon of the sports attachment into the hollow portion of the shaft;

aligning the fastening member with the aperture in the shaft; and urging at least a portion of the fastening member into the aperture.

7. The method of claim 6 and further comprising:

depressing the fastening member in a direction generally toward the tenon; and removing the tenon from the hollow portion.

8. A fastening mechanism for connecting a sports attachment to a shaft, the shaft having a handle end and an attachment end, the fastening mechanism comprising:

a hollow portion formed in the attachment end of the shaft, the hollow portion being tapered;

a tenon on the sports attachment, the tenon receivable within the hollow portion, the tenon having a taper corresponding to the taper of the hollow portion;

an aperture formed in the shaft into the hollow portion;

a fastening member mounted to the tenon of the sports attachment, at least a portion of the fastening member receivable within the aperture; and biasing means for biasing at least a portion of the fastening member into the aperture;

wherein the fastening member is releasably maintained within the aperture thereby releasably connecting the sports attachment to the shaft.

9. The fastening mechanism of claim 8 wherein the fastening member comprises:

a housing mounted to the sports attachment, the housing having a first open end and a longitudinal axis; and a first tubular member movable along the longitudinal axis within the first open end of the housing;

wherein the spring means biases the first tubular member in a general direction away from the housing to urge the first tubular member into the aperture of the shaft.

10. The fastening mechanism of claim 9 wherein the spring means comprises a coil spring.

11. The fastening mechanism of claim 9 and further comprising:

a flange about the open end of the housing; and a shoulder about the tubular member;

wherein the shoulder of the tubular member contacts the flange of the open end of the housing thereby limiting the extent of movement of the tubular member relative to the housing.

12. The fastening mechanism of claim 8, further comprising:

at least one ridge formed along the tenon for contacting the hollow portion within the aperture.

* * * * *